United States Patent [19]
Tyren et al.

[11] Patent Number: 5,297,439
[45] Date of Patent: Mar. 29, 1994

[54] MAGNETOELASTIC STRESS SENSOR

[76] Inventors: Carl H. Tyren, 12, Boulevard Albert-ler,, F06600 Antibes; Donald G. Lord, 69, Woodford Road, Bramhall, Cheshire SK7 1JR, England

[21] Appl. No.: 829,087
[22] PCT Filed: Jun. 27, 1990
[86] PCT No.: PCT/SE90/00444
 § 371 Date: Feb. 13, 1992
 § 102(e) Date: Feb. 13, 1992
[87] PCT Pub. No.: WO91/00494
 PCT Pub. Date: Jan. 10, 1991

[30] Foreign Application Priority Data
 Jun. 28, 1989 [SE] Sweden ................ 8902330-3

[51] Int. Cl.⁵ .................................................. G01B 7/16
[52] U.S. Cl. .................................. 73/779; 73/862.69; 324/209; 340/870.32
[58] Field of Search ...................... 73/779, 862.69, 775, 73/773, 779; 324/209; 340/870.31, 870.32, 572

[56] References Cited

U.S. PATENT DOCUMENTS

| | | | |
|---|---|---|---|
| 3,636,437 | 1/1972 | Soulant, Jr. et al. | 324/209 |
| 3,827,291 | 8/1974 | McCalvey | 73/779 |
| 4,312,001 | 1/1982 | Marzolf | 340/870.32 X |

*Primary Examiner*—Jerry W. Myracle
*Attorney, Agent, or Firm*—Gunn, Lee & Miller

[57] ABSTRACT

A measuring sensor having a magneto-elastic element and an electronic resonant circuit for sensing mechanical stress of an object. The sensor is firmly attached to the object being measured and creates a resonance frequency. The resonance frequency is transmitted to an aerial in a contactless, position-independent manner.

10 Claims, 2 Drawing Sheets

MAGNETOELASTIC STRESS SENSOR

The present invention relates to a sensor far detecting mechanical stress, deformation or similar magnitudes of an object of measurement.

STATE OF THE ART

When measuring mechanical stress, strain or force it is known to make use of measuring sensors based on magneto-elastic material. Magneto-elastic material has the advantage that it enables contactless signal transmission from a magneto-elastic sensor element to an electronic unit for evaluation of the signal from the sensor element.

The relative permeability of a magneto-elastic element depends on the mechanical stress to which the element is subjected, e.g. by a strain within the surface on which it is mounted. During this process, signal scanning can be achieved with the aid of a coil system, the inductance of which is influenced by the permeability of the magneto-elastic element.

An important application area for magneto-elastic sensors is torque measurement on rotating shafts, for instance as described in patent specification WO 88/00690. In this case the magneto-elastic element is mounted in two axial zones mutually beside one another on a rotating shaft, with the element oriented in the two main directions of stress. A coil system consisting, on the one hand, of two sensor solenoids and, on the other hand, an excitation solenoid extending axially over both sensor solenoids is mounted with the shaft extending axially within and through the solenoids.

This embodiment has the advantage that the sensor solenoids permit moderate axial displacements of the rotating shaft in relation to the solenoids without significant effect on the output signal. They have the disadvantage that the solenoids entirely enclose the rotating shaft with attendant requirements as regards accessibility during assembly and use.

In view of this disadvantage there are also sensor coils which do not surround but instead face the rotating shaft with the coil's axis of symmetry oriented in the radial direction of the rotating shaft. However, this arrangement of the sensor coils has the important disadvantage that the output signal does not only depend on the permeability of the magneto-elastic element but also to a great extent on the displacement of the rotating shaft relative to the sensor coils. A method of reducing this disadvantage is described in patent specification DE 3620412 A1, but this invention can only deal with relatively small displacements. None of the known sensor coil arrangements are particularly suitable for a more detailed analysis of complex stress situations.

So as to enable high accuracy of the measuring result it is desirable for the sensor not to be subject to any significant relationship of dependence as regards the distance between the coil and the magneto-elastic element, as is the case with known embodiments.

Arrangements for contactless signal transmission are as such known in many contexts. Within an entirely different sphere of technology, i.e. with anti-theft systems, it is known to make use of so-called anti-theft labels. Such systems consist of a detection system capable of identifying by electromagnetic means the proximity of an anti-theft label within a detection zone, thereby the detection is in principle based on some resonance phenomenon.

Patent specification U.S. Pat. No. 4,578,654 describes such an anti-theft label with an LC circuit produced by thick-film technology and enclosed in the label. The signal transmission is effected with the aid of a detection system comprising also aerials and a transmitter. High-frequency energy from the transmitter excites the LC circuit causing it to oscillate at a predetermined resonance frequency, which in its turn is detected by a receiver in the detection system. The resonance of the LC circuit can be detected without difficulty within a large detection zone about the aerials and irrespective of the LC circuit's position in relation to the aerial.

However, the anti-theft label serves only to detect whether an object is within a certain zone or not. The signal from the label does not, accordingly, contain any information about any measured quantity or similar value.

PURPOSE OF THE INVENTION

The present invention is intended to exploit the advantages of these two different spheres of technology. It is therefore the object of the invention to enable simple, reliable measurement of an element's deformation and to transfer the measuring signal in contactless manner, without the measuring signal being influenced by the distance between the sensor itself and the detection system.

In accordance with the invention this is achieved by designing the sensor as a measuring body consisting of magneto-elastic material and an electric resonance circuit which includes an electric coil are inductively coupled and are integrated into a unit which is firmly attached to the object of measurement.

By integrating, in accordance with the invention, a magneto-elastic element with the coil in a resonance circuit, these components form a unit which can be easily attached to an object of measurement. Depending on the measured value picked up, the resonance frequency of the resonance circuit is changed, and its frequency can be scanned by means of high-frequency electromagnetic radiation. The measured signal is, accordingly, changed to a frequency which in contactless manner can be detected with the aid of as such known auxiliary means and without being subject to any relationship of dependence in respect of the distance between the sensor and the detection means.

A further essential advantage of designing the sensor as an integrated unit consists in the fact that it can be easily applied to different objects of measurement, even if the latter are hard to reach during the measuring process. Besides, the sensor can be produced at low cost and easily mass-produced as a standard component.

Inasmuch as the coil can be mounted near and in fixed position relative to the measuring body, the coil's inductance is more closely related to the mechanical stresses, to which the measuring body is subject. As a result it is possible to obtain a strong and accurate measuring signal.

Further advantages and characteristics distinguishing the invention can be gathered from the attached specification exemplifying the invention in respect of some different embodiments.

LIST OF FIGURES

The description is presented with reference to the attached drawings of which

DESCRIBED EXAMPLE OF THE INVENTION

Figure 1:
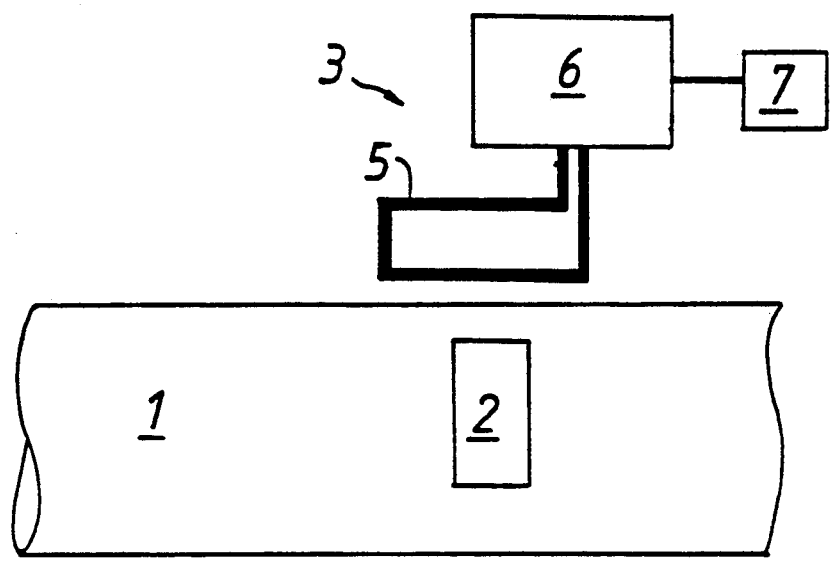
FIG. 1 shows a block diagram of a measuring arrangement including a sensor according to the invention.

A part shown in schematic manner in FIG. 1 and pertaining to a shaft 1 exemplifying a movable element is assumed to rotate and to be subject to a torque which is to be measured. To this end, a sensor 2 is attached to the outer surface of shaft 1, for instance by means of adhesive, whereby the torque can be measured indirectly by means of strain measurement on shaft 1. Sensor 2, the detailed design of which is described below, co-operates with a detection arrangement 3 arranged on a mounting element, for instance the support structure of shaft 1 or a similar device. Detection arrangement 3 comprises a transmitter and a receiver of electromagnetic radiation within the high-frequency band, both of which make use of a common aerial 5. In the Figure, the transmitter and the receiver are integrated with a common electronic unit 6, which also comprises means for signal-processing of signals from sensor 2. Also in this case an indicator unit 7 is connected to electronic unit 6, said indicator unit being intended to indicate a measured value from sensor 2. Instead of indicating a measured value, the corresponding signal from electronic unit 6 can, of course, be used in applications for controlling different processes, it being possible, for instance, to make use of the signal in order to decouple the drive of shaft 3 if a certain measured value is exceeded.

Figure 2:
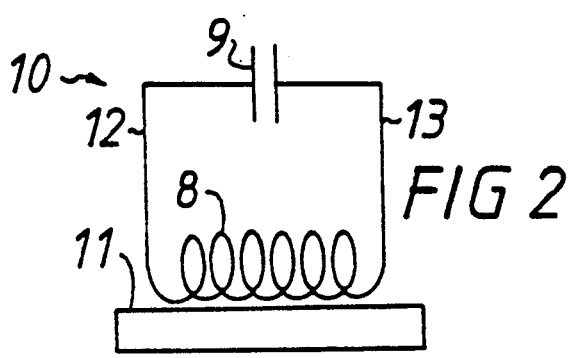
FIGS. 2, 3 and 4 show different alternative electrical circuit diagrams for the sensor.

A simple type of sensor 2 is presented in FIG. 2 which shows an electric circuit diagram for sensor 2. In this case, a coil 8 and a capacitor 9 jointly constitute an electric resonance circuit 10. Coil 8 is provided with a magnetic core made from a magneto-elastic material, referred to below as magneto-elastic element 11 and intended to be attached to the outer surface of shaft 1. Magneto-elastic element 11 constitutes the sensor's measuring body.

Coil 8 is therefore inductively connected with magneto-elastic element 11. Magneto-elastic element 11 is advantageously made from an amorphous material. In this case, two electric conductors 12, 13 connecting coil 8 with capacitor 9 also constitute together with coil 8 an integrated aerial capable of receiving and transmitting electromagnetic radiation from and to detection arrangement 3.

Figure 3:
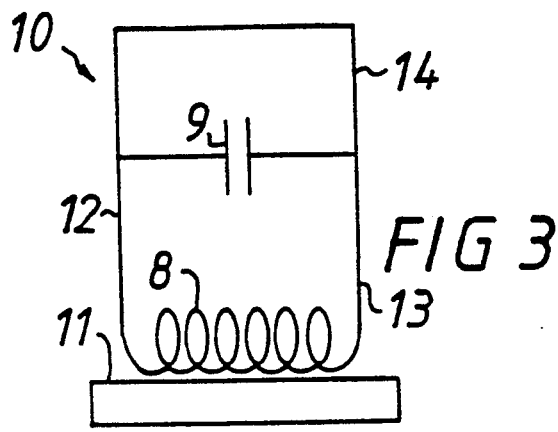

FIG. 3 shows a modified embodiment of a sensor 2 corresponding with the sensor in FIG. 2, but with, in addition, a special aerial 14 arranged parallel with coil 8 and capacitor 9.

Figure 4:
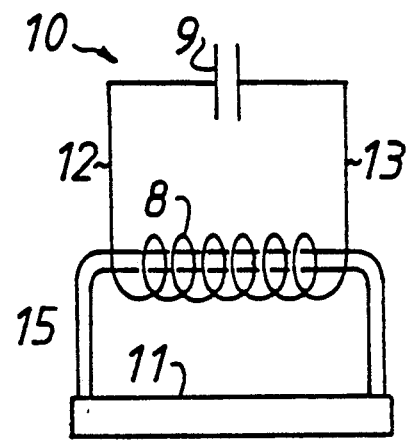

FIG. 4 shows, in addition, a modified embodiment in which magneto-elastic element 11 is indirectly linked with coil 8, via an inductive conductor 15.

Figure 5:
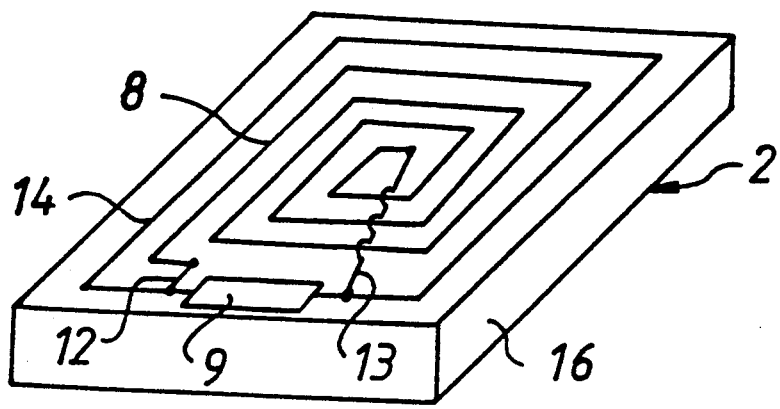
FIGS. 5 and 6 show different practical embodiments of the sensor.

FIG. 5 shows an example indicating how sensor 2 can be designed physically. Magneto-elastic element 11 is designed as a thin strip 16 or as a plate, on the upper side of which is secured, in a predetermined position, electric coil 8. Coil 8 is designed as a flat spiral connected in parallel with capacitor 9 and an aerial loop 14, in accordance with the circuit diagram shown in FIG. 3. Also capacitor 9 and aerial 14 are secured in analogous manner to the upper side of element 11. Coil 8 is made from wire material or, alternatively, thin foil material. Capacitor 9 is advantageously designed so as to be flat as is also coil 8 and strip 16, so that the entire sensor is of substantially flat and thin configuration. In FIG. 5, strip 16 is shown disproportionately thick. In practice it can be made very thin, of the order of magnitude of 30 $\mu$m or at least less than 1 mm. Strip 16 as well as the entire sensor 2 is therefore flexible and can readily be formed in accordance with the surface of object of measurement 1. Between on one side coil 8, capacitor 9 and aerial 14 and on the other side magneto-elastic element 11 there is an electrical insulation, for instance in the shape of a thin ceramic disc (not shown). Also line 13 shown in FIG. 5, which transversely connects the inner end of coil 8 with capacitor 9, is electrically insulated from coil 8. In this manner resonance circuit 10 and magneto-elastic element 11 constitute a unit which can be easily handled and attached to shaft 1 or any other object of measurement.

Figure 6:
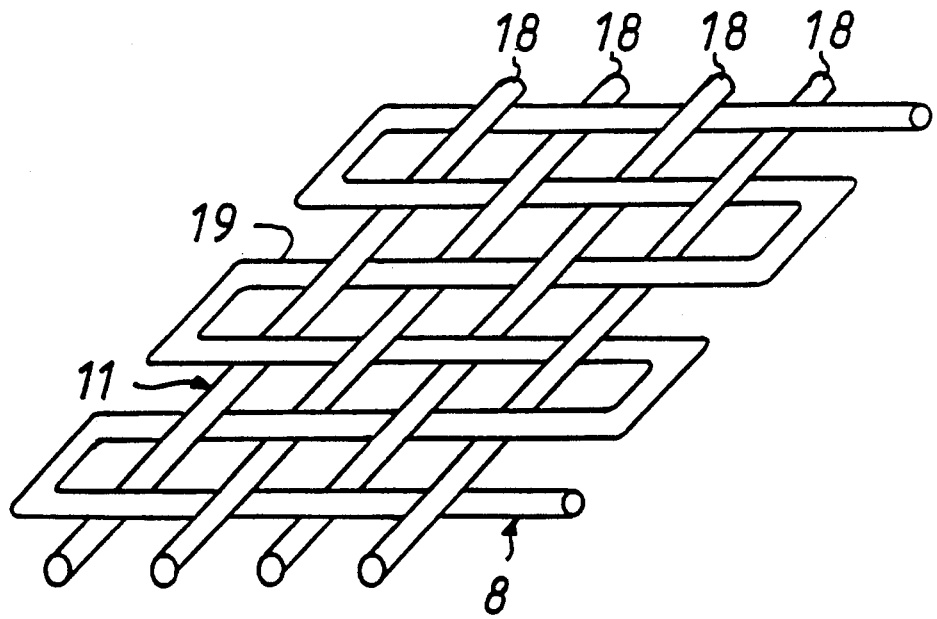

FIG. 6 exemplifies a modified embodiment of coil 8 of sensor 2 and magneto-elastic element 11. Magneto-elastic element 11, which constitutes the core of coil 8, is in this case formed by a number of mutually parallel conductors 19 so as to form a loop. The electrical conductors 19 forming coil 8 are substantially oriented at right angles in relation to wires 18 of the magneto-elastic material so that jointly they form a network of an interlocking structure similar to a weave. With this sensor application electric coil 8 is, in addition, linked with capacitor 9 and aerial 14, which however are not shown in FIG. 6. Capacitor 9 can advantageously be placed on top of the weave-type structure so that they jointly form an integrated unit. Aerial 14 can also be placed on top of the weave-type structure or be arranged so as to surround the latter about its periphery.

In order to facilitate handling, the weave, capacitor 9 and aerial 14 can, in addition, be embedded in a surrounding casing. The casing may, for instance, consist of a thin film material made of plastic. The entire unit can be simply attached to shaft 1 by glueing, vulcanisation or similar means. However, the elasticity of the casing must not be too high. The casing or the film must consist of a material capable of transmitting actual stresses or deformations to the magneto-elastic wires 18.

The concrete configuration of measuring sensor 2 can also be designed in other alternative forms. Coil 8 and capacitor 9 can, for instance, be designed as conductors embedded in a plastic laminate with a layer in which are embedded wires of magneto-elastic material firmly attached to said plastic laminate. However, a characteristic common to all embodiments consists in the fact that electric resonance circuit 10 is firmly linked with magneto-elastic element 11 so as to produce an integrated unit. Furthermore, coil 8 is located in immediate proximity and in a fixed position relative to magneto-elastic element 11. Capacitor 9 and, if applicable, a separate serial 14 are also advantageously integrated in such a unit. Coil 8 and capacitor 9 as provided can, of course, in practice be also designed as a plurality of mutually co-operating coils and/or capacitors, which jointly constitute a resonance circuit 10.

With an application for measuring a torque on rotating shaft 1 according to FIG. 1, measuring sensors 2 as described operate as follows. The torque acting on shaft 1 causes a mechanical stress and a corresponding deformation within said shaft's outer surface. Measuring sensor 2, which is firmly attached in a fixed position to shaft 1, with magneto-electric element 11 facing shaft 1, is, as a result, subject to a corresponding mechanical stress and deformation. This causes its permeability to be changed which also entails a change in inductance of coil 8 forming part of resonance circuit 10. In consequence thereof also the resonance frequency of resonance circuit 10 changes.

With the aid of the transmitter included in electronic unit 6, an electromagnetic radiation, more precisely a radio signal, is transmitted via aerial 5 to measuring sensor 2. The transmitter is designed to emit radio signals with variable but definite frequencies. Initially the transmitter emits a signal with a sweep frequency within the frequency band applicable to the given resonance circuit 10.

If the emitted signal is transmitted at a frequency corresponding to the resonance frequency of resonance circuit 10 applying in the given case, said resonance circuit is excited and caused to self-oscillate.

Hence it also acts as a radio transmitter, the emitted signal of which is received by the receiver of electronic unit 6. As soon as a signal is received in this manner, this confirms that resonance circuit 10 has reached a state of self-oscillation, and its actual resonance frequency can be calculated in accordance with the stated frequency of the transmitter. This frequency also constitutes a measure for the deformation of magneto-elastic element 11 and can accordingly be used to calculate, in as such known manner, the torque to which shaft 1 is subject.

The transmitter and receiver of electronic unit 6 are, in addition, as is as such well known in the sphere of radio, adapted to one another so that the transmitter's frequency can be varied successively and automatically in a manner ensuring that the resonance circuit undergoes continuous self-oscillation, even if its frequency is changed owing to the fact that the loads to which the magneto-elastic element is subject are changed. The frequency at which resonance circuit 10 oscillates always constitutes a measured value representing an actual deformation of the object subject to measurement.

Measuring sensor 2 can, of course, be used in as such conventional manner, in order to detect other magnitudes such as force, pressure etc., which can be directly or indirectly deduced from mechanical deformation.

The frequency, which accordingly represents a measured variable, is, at least as regards reasonable distances, entirely independent of the distance between measuring sensor 2 and detection arrangement 3. The best conditions for signal transmission exist if resonance circuit 10 of measuring sensor 2 is designed with a separate aerial 14, in accordance with the embodiment shown in FIG. 3. As a result, an accurate and strong measuring signal can also be obtained if the object of measurement moves in relation to detection arrangement 3. For separate aerial 14 forms jointly with capacitor 9 a closed circuit in which a strong current can pulsate and give rise to a correspondingly strong emitted signal from aerial 14. If an aerial 14 is not used, the inductance of coil 8 limits such a strong current. For the same reason, the changed frequency of the resonance circuit is subject to better resolution and yields a more accurate measuring result when the inductance of the coil is changed, if use is made of a separate aerial 14. Aerial 5 of the electronic unit can alternatively be designed in the form of two separate aerials for the transmitter or receiver respectively.

The capacitor's capacitance value must be selected in relation to the coil's inductance value and if required with regard to aerial 14 so that the resonance frequencies of the resonance circuit are held within a desired frequency band and without exceeding an upper frequency limit, in order to ensure that the magneto-elastic element will be able to take part in the resonance. A suitable frequency band would be between 100 kHz and 100 MHz.

With more developed embodiments several measuring sensors can be connected to the same object of measurement, each of them scanning different magnitudes, for instance forces acting in different directions. In these cases the same detection arrangement can be used for several measuring sensors, provided that each of these can be identified, for instance by means of resonance frequencies within different frequency bands.

Even though many advantages are obtained if coil 8 and capacitor 9 are connected parallel to one another, it is also possible to connect them instead in series with one another. In this case it is not necessary for them to form a closed circuit.

The scope of the invention is not only limited to the embodiments herein described but includes also other embodiments in accordance with what has been stated in the attached claims and where the permeability of a magneto-elastic element influences the resonance frequency of a system.

We claim:

1. Sensor for detecting mechanical influence on an object of measurement comprising:
   an element of magneto-elastic material;
   an electric resonant circuit having an electric coil inductively coupled to said element;
   said element and said circuit being integrated into a unit firmly attached to said object of measurement;
   an aerial connected to said resonant circuit for wireless reception and transmission of electromagnetic energy, wherein transmitted energy from said circuit forms a measuring signal.

2. Sensor according to claim 1, wherein said element is made of an amorphous material.

3. Sensor according to claim 1, wherein said element and said electric resonance circuit are arranged next to one another in a generally flat configuration.

4. Sensor according to claim 1, wherein said resonance circuit further comprises a capacitor connected in parallel with said coil.

5. Sensor according to claim 4, wherein said aerial is connected in parallel with said coil.

6. Sensor according to claim 4, wherein said coil, said capacitor and said aerial are dimensioned relatively to one another such that a resonant frequency of said electric resonant circuit is within a high frequency band.

7. Sensor according to claim 1, wherein said element and said coil are an interlocking structure.

8. Sensor according to claim 7, wherein said interlocking structure consists of a network of magneto-elastic wires and electric conductors.

9. Sensor according to claim 7, wherein said interlocking structure further comprises electric insulation material of ceramic composition.

10. Method for contactless transmission of a measuring signal from a sensor according to claim 1,
    wherein a combined transmitter and receiver of electromagnetic energy within the high-frequency band is arranged in the proximity of said object of measurement;
    wherein said sensor is firmly attached to said object of measurement;
    wherein said combined transmitter and receiver is arranged to excite said resonant circuit; and
    wherein a receiver of said combined transmitter and receiver is arranged to detect a resonant frequency of said resonant circuit, said resonant frequency constituting a measuring signal corresponding to a deformation of said object of measurement.

* * * * *